(12) United States Patent
Lee et al.

(10) Patent No.: US 9,964,925 B2
(45) Date of Patent: May 8, 2018

(54) HOLOGRAPHIC DISPLAY ARCHITECTURE

(71) Applicant: Oculus VR, LLC, Menlo Park, CA (US)

(72) Inventors: Hee Yoon Lee, Redmond, WA (US); Wanli Chi, Sammamish, WA (US); Douglas Robert Lanman, Bellevue, WA (US)

(73) Assignee: Oculus VR, LLC, Menlo Park, CA (US)

( * ) Notice: Subject to any disclaimer, the term of this patent is extended or adjusted under 35 U.S.C. 154(b) by 211 days.

(21) Appl. No.: 14/983,109

(22) Filed: Dec. 29, 2015

(65) Prior Publication Data
US 2017/0185037 A1    Jun. 29, 2017

(51) Int. Cl.
| | |
|---|---|
| *G03H 1/00* | (2006.01) |
| *G03H 1/22* | (2006.01) |
| *G03H 1/16* | (2006.01) |
| *G03H 1/08* | (2006.01) |
| *G02B 27/01* | (2006.01) |

(52) U.S. Cl.
CPC ....... *G03H 1/2205* (2013.01); *G02B 27/0172* (2013.01); *G03H 1/0866* (2013.01); *G03H 1/16* (2013.01); *G03H 1/2294* (2013.01); *G02B 2027/0125* (2013.01); *G02B 2027/0174* (2013.01); *G03H 2001/221* (2013.01); *G03H 2001/2207* (2013.01)

(58) Field of Classification Search
CPC .... G02B 2027/0174; G02B 2027/0101; G02B 2027/0178; G02B 5/32; G02B 27/01; G02B 27/017; G02B 27/0172; G02B 27/0103; G02B 27/0101

USPC ....................................................... 359/9–16
See application file for complete search history.

(56) References Cited

U.S. PATENT DOCUMENTS

| | | | |
|---|---|---|---|
| 2008/0298207 A1* | 12/2008 | Teraoka | G11B 7/0065 369/103 |
| 2011/0157667 A1 | 6/2011 | Lacoste et al. | |

(Continued)

FOREIGN PATENT DOCUMENTS

WO    WO 2010/125367 A1    11/2010

OTHER PUBLICATIONS

Cakmakci, O. et al., "Head-Worn Displays: A Review," Journal of Display Technology, vol. 2, No. 3, Sep. 2006, pp. 199-216.

*Primary Examiner* — Bumsuk Won
*Assistant Examiner* — Tamara Y Washington
(74) *Attorney, Agent, or Firm* — Fenwick & West LLP (57) ABSTRACT

A holographic display ("display") for a head-mounted display ("HMD"). The display includes a source configured to emit at least partially coherent light and a beam conditioner that conditions the light from the source into one or more beams of light. The display also includes one or more spatial light modulators configured to encode the one or more beams of light using a hologram of a virtual reality image. The display further includes an objective lens and a conversion lens. The objective lens is positioned to create an intermediate image at a Fourier plane, and the intermediate image is a Fourier transform of the hologram. The conversion lens performs a Fourier transform of the intermediate image to generate an output hologram. The conversion lens also magnifies a portion of the output hologram and directs the magnified portion of the output hologram to an exit pupil of the HMD.

20 Claims, 6 Drawing Sheets

(56) References Cited

U.S. PATENT DOCUMENTS

| | | | |
|---|---|---|---|
| 2012/0268745 A1* | 10/2012 | Kudenov | G01J 3/447 356/453 |
| 2014/0355086 A1* | 12/2014 | Sugiyama | G03H 1/2294 359/9 |
| 2015/0241701 A1* | 8/2015 | Schowengerdt | G06T 13/40 359/633 |
| 2016/0077339 A1 | 3/2016 | Christmas et al. | |
| 2017/0131517 A1* | 5/2017 | Nagler | G02B 7/105 |
| 2017/0199116 A1* | 7/2017 | Yasuno | G01N 21/21 |

\* cited by examiner

HOLOGRAPHIC DISPLAY ARCHITECTURE

BACKGROUND

The present disclosure generally relates to displays, and specifically relates to holographic displays in head-mounted displays.

There are various forms of display technology that can be found in conventional head-mounted displays (HMDs). Computer generated holography is one such technology, however, while having relatively good resolution it has a very limited field of view. Computer generated holography is a way of generating a computer generated hologram. A difference between the traditional hologram and a computer generated hologram is how the original images are created. A traditional hologram is a holographic interference pattern of light from a real object and light from a coherent source. In contrast, a computer generated hologram may be calculated using known algorithms that simulate the holographic interference pattern of a traditional hologram. A virtual object can later be re-constructed using a coherent source and the computer generated hologram presented using a spatial light modulator (SLM).

HMDs in virtual reality systems and/or augmented reality systems typically have very large fields of view (e.g., 110 degrees or more). Construction of a virtual image using a computer generated hologram results in multiple diffractive orders of the virtual image that overlap spatially. In order to avoid overlap of diffractive orders and achieve a high field of view a pitch size of a SLM is approximately as small as a wavelength of the coherent source (e.g., 500 nanometers), whereas state-of-the-art SLMs have pitch sizes of about 3 micrometers (would correspond to about an 8 degrees of horizontal or vertical field of view). Accordingly, conventional computer generated holography systems are unable to provide large fields of view that are expected of HMDs for virtual reality and/or augmented reality applications.

SUMMARY

A holographic display that is part of a HMD. The HMD may be part of, e.g., a virtual reality ("VR") and/or augmented reality ("AR") system environment. In some embodiments, the holographic display includes a source, a beam conditioner, an SLM, an objective lens, and a conversion lens. The source emits coherent light, and the beam conditioner conditions the light from the source into one or more beams of light. The SLM encodes the one or more beams of light using a hologram (computer generated) of a synthetic image. The objective lens has a first focal length and is positioned to create a Fourier transform of the hologram at a Fourier plane of the conversion lens. The conversion lens has a second focal length and is positioned away from the Fourier plane by the second focal length. The conversion lens performs a Fourier transform of the Fourier transform of the hologram to position an output hologram at the exit pupil which is at back focal plane of the conversion lens. When a person looks through the output hologram, the eyes of the viewer convert the output hologram to a reconstructed image of the synthetic image. The conversion lens also magnifies a portion of the reconstructed image. The conversion lens directs the magnified portion of the reconstructed image to an exit pupil of the HMD corresponding to a location of an eye of a user of the HMD.

The holographic display is configured to have a large field (vertically and/or horizontally) of view using e.g., a telescope, image tiling, a masked SLM, or some combination thereof. The telescope is composed of the objective lens and the conversion lens. The magnification of the telescope is based in part on the first focal length of the objective lens and the second focal length of the conversion lens. A field of view of the holographic display may be increased by selecting the focal lengths of the objective lens and/or conversion lens such that the magnification of the reconstructed image is a particular amount (e.g., fills the exit pupil).

In some embodiments, a reconstructed image may be greater than a single image field of view. The single image field of view is the largest field of view that a reconstructed image of a synthetic image spans before clipping occurs. A holographic display including an expanded field of view handles such images by tiling portions of a reconstructed image that are each smaller than the single image field of view together such that the reconstructed image is presented at the exit pupil. The holographic display includes a spatial filter in the Fourier plane which is able to selectively block and transmit light in 2 dimensions.

In some embodiments, the holographic display performs image tiling by adding prism terms to hologram instructions used to generate the hologram. The prism terms acts to horizontally and/or vertically shift the hologram. The holographic display selects a particular portion of the image, shifts the hologram using prism terms associated with the selected portion, and filters light not associated with the selected portion using the spatial filter such that a reconstructed portion of the selected portion is provided to the exit pupil. The holographic display performs similar operations for each portion of the image. The holographic display cycles through each of the portions of the reconstructed image rapidly such that a viewing user's eye would see all of the portions of the reconstructed image together as a single image.

In some embodiments, the holographic display performs image tiling by generating a plurality of beams that interact with the hologram at different angles. As each of the beams are incident on the SLM at a different angle, they each are associated with a different field of view of the reconstructed image. In some embodiments, the plurality of beams are generated using a plurality of sources. Alternatively, a diffraction grating may be used to diffract light from a source into multiple beams. The holographic display includes an additional spatial filter that selects a beam associated with a particular portion of a reconstructed image, as well as a spatial filter at the Fourier plane. The holographic display selects a beam associated with the particular portion of the reconstructed image and blocks the remaining beams using the spatial filters. The holographic display cycles through each of the beams using the spatial filters rapidly such that a viewing user's eye would see all of the portions of the reconstructed image together as a single image. This type of tiling may be performed vertically and/or horizontally. Additionally, in some embodiments, it may be done in combination with adding prism terms.

Additionally, in some embodiments, the SLM may be replaced with a masked SLM. A masked SLM is a SLM that includes an amplitude mask. The amplitude mask overlays the SLM and in some embodiments, may be part of the SLM. The amplitude mask includes a single pinhole per SLM pixel. In embodiments where each pinhole is located at a random location over the corresponding SLM pixel, higher orders of diffraction are eliminated, thereby increasing the field of view of the holographic display. In alternate embodiments, the pinholes may be located at the same relative location above each SLM pixel (e.g., all located at the top left of corresponding SLM pixel). Such a configuration increases field of view, but in a manner where there are overlapping diffraction orders that can be accounted for using the tiling techniques described above.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
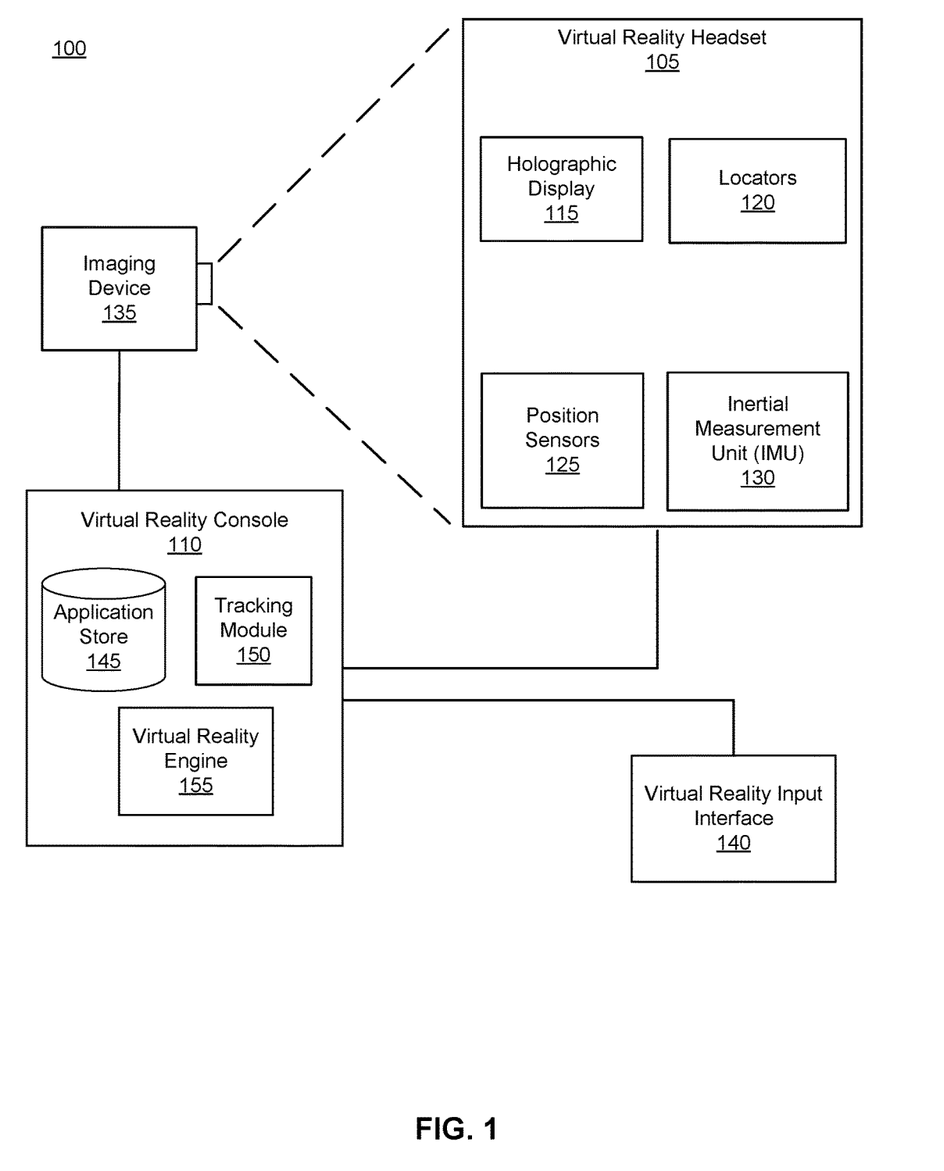
FIG. 1 is a diagram of a system environment including a VR system, in accordance with an embodiment.

FIG. 1 is a block diagram of a VR system environment 100 in which a VR console 110 operates. The system environment 100 shown by FIG. 1 comprises a VR headset 105, an imaging device 135, and a VR input interface 140 that are each coupled to the VR console 110. While FIG. 1 shows an example system 100 including one VR headset 105, one imaging device 135, and one VR input interface 140, in other embodiments any number of these components may be included in the system 100. For example, there may be multiple VR headsets 105 each having an associated VR input interface 140 and being monitored by one or more imaging devices 135, with each VR headset 105, VR input interface 140, and imaging devices 135 communicating with the VR console 110. In alternative configurations, different and/or additional components may be included in the system environment 100. Similarly, functionality of one or more of the components can be distributed among the components in a different manner than is described here. For example, some or all of the functionality of the VR console 110 may be contained within the VR headset 105. Additionally, in some embodiments the VR system 100 may be modified to include or other system environments, such as an AR system environment.

The VR headset 105 is a head-mounted display that presents media to a user. Examples of media presented by the VR headset 105 include one or more images, video, audio, or some combination thereof. In some embodiments, audio is presented via an external device (e.g., speakers and/or headphones) that receives audio information from the VR headset 105, the VR console 110, or both, and presents audio data based on the audio information. Some embodiments of the VR headset 105 are further described below in conjunction with FIG. 2. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the VR headset 105 may also act as an AR headset. In these embodiments, the VR headset 105 augments views of a physical, real-world environment with computer-generated elements (e.g., images, video, sound, etc.).

The VR headset 105 includes a holographic display 115, one or more locators 120, one or more position sensors 125, and an inertial measurement unit (IMU) 130. The holographic display 115 generates a hologram based on a synthetic image. The holographic display 115 generates an intermediate image of the using the hologram. The intermediate image has a plurality of image orders. The holographic display 115 selects a particular order, and performs a Fourier transform on the selected order to generate an output hologram that is presented to a user. An eye of the viewing user converts the output hologram such that a reconstructed image of the synthetic image is imaged on a retina of the eye. The holographic display 115 presents images to the user in accordance with data received from the VR console 110. In various embodiments, the holographic display 115 may comprise a single holographic display element or multiple holographic display elements (e.g., a display for each eye of a user). Details for various embodiments of each holographic display element are discussed in detail below with regard to FIGS. 3-6.

In some embodiments, a reconstructed image may be greater than a single image field of view. The single image field of view is the largest field of view that a reconstructed image of a synthetic image spans before clipping occurs. As discussed in detail below, a holographic display element is able to extend its field of view using a telescope, image tiling, masked SLMs, or some combination thereof. In this manner, a holographic display element can generate a high resolution synthetic image that spans a relatively large field of view (e.g., up to the field of view of the VR headset 105).

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof In embodiments where the locators 120 are active (i.e., an LED or other type of light emitting device), the locators 120 may emit light in the visible band (~380 nm to 750 nm), in the infrared (IR) band (~750 nm to 10 micrometers), in the ultraviolet band (10 nm to 380 nm), some other portion of the electromagnetic spectrum, or some combination thereof.

In some embodiments, the locators 120 are located beneath an outer surface of the VR headset 105, which is transparent to the wavelengths of light emitted or reflected by the locators 120 or is thin enough to not substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retroreflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action.

The VR console 110 provides media to the VR headset 105 for presentation to the user in accordance with information received from one or more of: the imaging device 135, the VR headset 105, and the VR input interface 140. In the example shown in FIG. 1, the VR console 110 includes an application store 145, a tracking module 150, and a VR engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the HR headset 105 or the VR interface device 140. Examples of applications include: gaming applications, conferencing applications, video playback application, or other suitable applications.

The tracking module 150 calibrates the VR system 100 using one or more calibration parameters and may adjust one or more calibration parameters to reduce error in determination of the position of the VR headset 105. For example, the tracking module 150 adjusts the focus of the imaging device 135 to obtain a more accurate position for observed locators on the VR headset 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120), the tracking module 140 re-calibrates some or all of the system environment 100.

The tracking module 150 tracks movements of the VR headset 105 using slow calibration information from the imaging device 135. As further described below in conjunction with FIG. 3, the tracking module 150 determines positions of a reference point of the VR headset 105 using observed locators from the slow calibration information and a model of the VR headset 105. The tracking module 150 also determines positions of a reference point of the VR headset 105 using position information from the fast calibration information. Additionally, in some embodiments, the tracking module 150 may use portions of the fast calibration information, the slow calibration information, or some combination thereof, to predict a future location of the headset

105. The tracking module 150 provides the estimated or predicted future position of the VR headset 105 to the VR engine 155.

The VR engine 155 executes applications within the system environment 100 and receives position information, acceleration information, velocity information, predicted future positions, or some combination thereof of the VR headset 105 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

Figure 2:
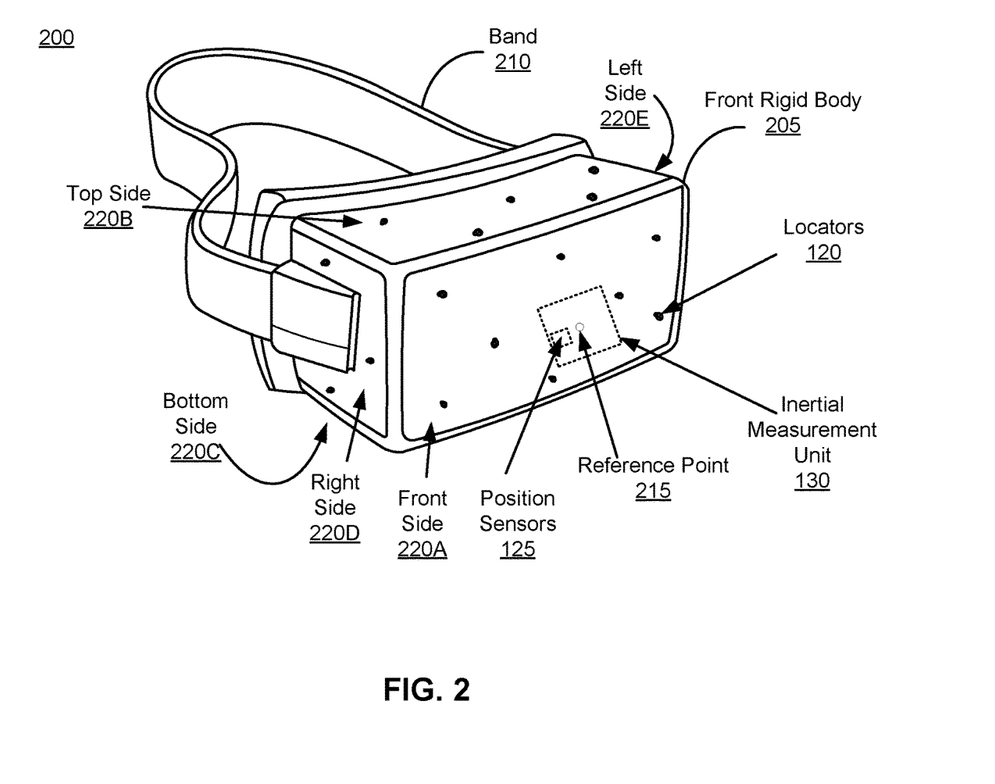
FIG. 2 is a wire diagram of a VR headset, in accordance with an embodiment.

FIG. 2 is a wire diagram of a VR headset 200, in accordance with an embodiment. The VR headset 200 is an embodiment of the VR headset 105, and includes a front rigid body 205 and a band 210. The front rigid body 205 includes one or more holographic display elements of the holographic display 115 (not shown), the IMU 130, the one or more position sensors 125, and the locators 120. In the embodiment shown by FIG. 2, the position sensors 125 are located within the IMU 130, and neither the IMU 130 nor the position sensors 125 are visible to the user.

The locators 120 are located in fixed positions on the front rigid body 205 relative to one another and relative to a reference point 215. The reference point 215 is located at the center of the IMU 130. Each of the locators 120 emit light that is detectable by the imaging device 135. Locators 120, or portions of locators 120, are located on a front side 220A, a top side 220B, a bottom side 220C, a right side 220D, and a left side 220E of the front rigid body 205 in the example of FIG. 2A.

Figure 3:
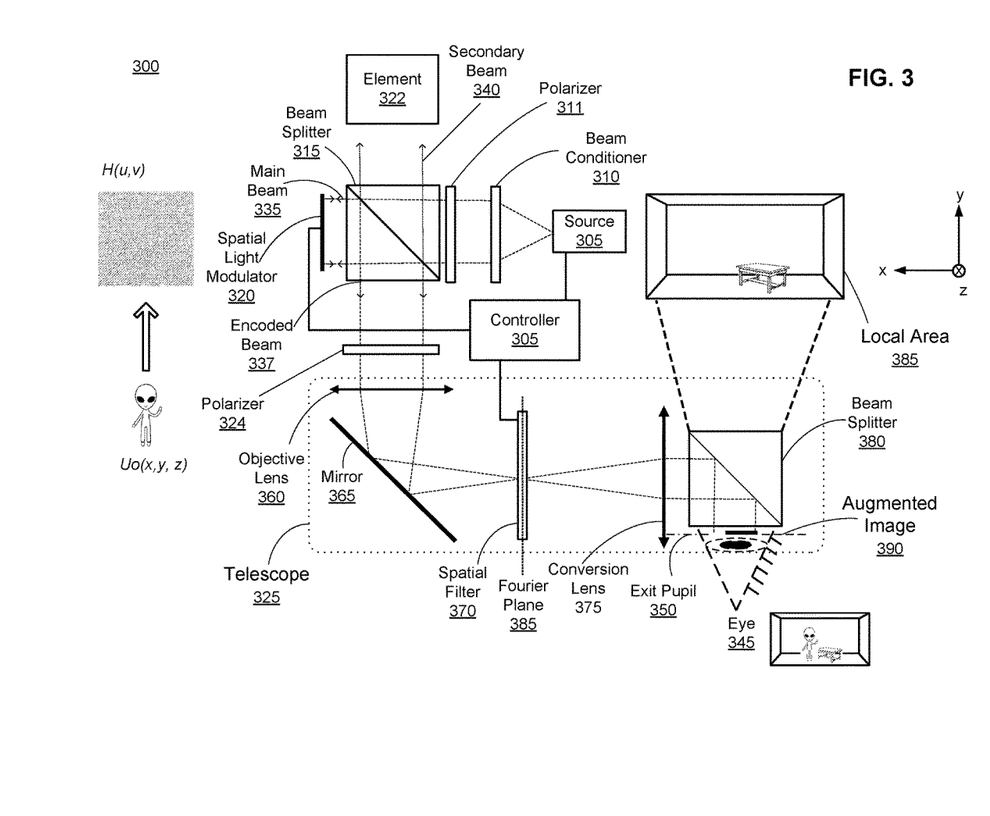
FIG. 3 illustrates an example holographic display element, according to an embodiment.

FIG. 3 illustrates an example holographic display element 300, according to an embodiment. In some embodiments, the holographic display element 300 is a component (e.g., holographic display 115) of the VR headset 105, or some other VR and/or AR HMD. In alternate embodiments, the holographic display element 300 is part of some other HMD, or other system that directs display light to a particular location.

Some embodiments of the holographic display element 300 have different components than those described here. Similarly, in some cases, functions can be distributed among the components in a different manner than is described here.

The holographic display element 300 includes an illumination source 305, a beam conditioner 310, a polarizer 311, a beam splitter 315, a SLM 320, an element 322, a polarizer 324, a telescope 325, and a controller 305. For purposes of illustration, FIG. 3 shows a holographic display element 300 associated with a single eye 345, but in some embodiments, another holographic display separate (or partially separate) from the holographic display element 300, provides altered image light to another eye of the user. In a partially separate system, one or more components may be shared (e.g., the source 305, the beam conditioner 310, the controller 330, etc.).

The source 305 generates light for reconstruction of a computer generated hologram. The source 305 is a coherent or partially coherent light source. The source 305 may be, e.g., laser diode, a vertical cavity surface emitting laser, a light emitting diode, a tunable laser, or some other light source that emits coherent or partially coherent light. The source 305 emits light in the visible band, and it may emit light that is continuous or pulsed. In some embodiments, the source 305 may be a laser that emits light at a particular wavelength (e.g., 532 nanometers). The source 305 emits light in accordance with one or more illumination parameters received from the controller 330. An illumination parameter is an instruction used by the source 305 to generate light. An illumination parameter may include, e.g., source wavelength, pulse rate, pulse amplitude, beam type (continuous or pulsed), other parameter(s) that affect the emitted light, or some combination thereof.

The beam conditioner 310 conditions the light from the source 305 into one or more beams of light. Conditioning of light is preparing light for incidence on one or more SLMs 320. The beam conditioner 310 may include, for example, a beam expander, a collimator, a diffraction grating, one or more lenses, a spatial filter, an optical isolator, other optical elements, or some combination thereof. For example, an optical isolator may be used to prevent light from traveling back toward the source 305. In the embodiment illustrated in FIG. 3 the beam conditioner 310 is a collimator, however, a different example of the beam conditioner 310 is discussed in detail below with regard to FIG. 4.

The polarizer 311 is a linear polarizer. The polarizer 311 is oriented to polarize the light to an orientation for the SLM 320. For example, the polarizer 311 may be linearly polarize the one or more beams of light to 45 degrees.

The beam splitter 315 splits the beam of light into a main beam 335 and a secondary beam 340. The main beam 335 is transmitted toward the SLM 320. The secondary beam 340 is directed toward the element 322.

The element 322 captures the light from the secondary beam 340. The element 322 may be, e.g., a baffling system, a source monitor, a SLM or some other light modulating element, or some combination thereof. A baffling system prevents the secondary beam 340 from propagating back through the holographic display element 300 towards the eye 345 of the user and/or the source 305. The source monitor monitors (e.g., one or more photodetectors) the secondary beam to ensure, e.g., that intensity and/or wavelength are in accordance with a design specification and power is below the eye safe threshold. The output from the source monitor may be provided to, e.g., the controller 330 and/or the source 305 to ensure emitted light are in accordance with the design specification.

The SLM 320 generates a computer generated hologram responsive to hologram instructions received from the controller 330. Hologram instructions are instructions used by an SLM to generate a computer generated hologram. A computer generated hologram, $H(u,v)$, is a simulated holographic interference pattern associated with a three-dimensional objects $U_o(x,y,z)$ (i.e., a synthetic image), where u and v are spatial coordinates on a hologram plane and x, y and z are spatial coordinates on an object space. If the reconstructed image is located at infinity, which is equivalent to the reconstructed image being located at the Fourier plane 385, and they are Fourier transform pair (Far-field Fraunhofer diffraction). However, the reconstructed image could be closer than infinity, and is solved for using a Fresnel equation rather than Fraunhofer. For example, $H(u,v)$ may be calculated from the Fresnel diffraction equations as follows:

$$H(u, v) = \sum_{i=1}^{n} \frac{e^{jkz_i}}{j\lambda z_i} e^{\frac{jk}{2z_i}(u^2+v^2)} \cdot \qquad (1)$$

$$\int\int \left\{ Uo(x, y, z_i) \cdot e^{\frac{jk}{2z_i}(x^2+x^2)} \right\} \cdot \exp\left(\frac{-j2\pi}{\lambda z_i}(xu+yv)\right) dxdy$$

where the 3D object ($U_o(x,y,z)$) is sliced in depths at a discrete location $z_i$ (i=1 ... n), k is a wavenumber ($2\pi/\lambda$), and $\lambda$ is wavelength of the light (i.e. 532 nm).

The SLM 320 includes a plurality of addressable pixels that can modulate light amplitude, light phase, light polarization, or some combination thereof in 2 dimensions (i.e., x and y). The SLM 320 in this example is reflective, however, in other embodiments, the SLM 320 may be transmissive. Additionally, while the holographic display element 300 shows a single SLM 320, it may be modified to have multiple SLMs 320 (e.g., one for light phase and another for light amplitude, or another phase SLM). By putting additional phase SLM at 322, two of phase-modulated holograms are created that are summed together when exiting the beam splitter 315. The summed two phase-modulated holograms create a complex-valued hologram. A complex hologram results in better image quality (e.g., increased sharpness, resolution, contrast, etc.) than, e.g., a phase-only modulated hologram.

The SLM 320 modulates the incident main beam 335 using the computer generated hologram to form an encoded beam 337. The encoded beam 337 propagates back to the beam splitter 315 and is directed toward the polarizer 324. The polarizer 324 is a linear polarizer that is used block other light from proceeding to the telescope 325.

The telescope 325 directs the encoded beam 337 toward an exit pupil 350 of the holographic display element 300. The exit pupil 350 is a location where the user's eye 345 is positioned. In directing the encoded beam 337 towards the exit pupil 350, the telescope 325 converts the encoded beam 337 into a virtual image and magnifies the virtual image. The virtual image is a reconstructed image of some portion of the synthetic image, or possibly the entire synthetic image. The telescope 325 includes an objective lens 360, a mirror 365, a spatial filter 370, a conversion lens 375, and a beam splitter 380, or some combination thereof.

The objective lens 360 is a positive lens that performs a Fourier transform on the encoded beam 337 to generate an intermediate image F(H(u, v))=Uo'(x, y, z)). The objective lens 360 has a focal length, $f_o$. A path length from the objective lens 360 to the Fourier plane 385 is $f_o$. The mirror 365 directs light from the objective lens 360 to position the intermediate image at the Fourier plane 385 of the conversion lens 375. Note, the mirror 365 is specific to the illustrated embodiment, in alternate embodiments, no mirror 365 is present, or it is replaced with a plurality of folding mirrors. The folding mirrors may be chosen to help achieve a specified form factor for the holographic display 300.

It is important to note that the 2D Fourier transform of H(u, v) results in the intermediate image Uo'(x, y, z) that has a plurality of orders. For example, the intermediate image Uo'(x, y, z) is associated with a fundamental order (i.e., zeroth order) and a plurality of higher orders (±1, ±2, . . . ) typically of lessor power. A copy of the image is associated with each order, and each of the copies are separated and offset from each other. These orders can limit the field of view of holographic displays.

The spatial filter 370 blocks non-selected orders of the intermediate image Uo'(x, y, z), and passes a selected order associated with the intermediate image Uo'(x, y, z) in accordance with one or more filters instruction from the controller 330. A filter instruction describes a configuration of the spatial filter 370 to block and/or pass different portions of light (e.g., orders associated with the intermediate image Uo'(x, y, z)). The spatial filter 370 controls the transmission of light through the spatial filter 370 in both x and y. The spatial filter 370 may include, e.g., one or more polarizers and a liquid crystal panel, or a fixed mask pattern (e.g., a pattern of reflective chrome deposited on a sheet of glass). The spatial filter 370 transmits an order of the intermediate image Uo'$_n$(x, y, z), where 'n' is the image order. Note, in some embodiments, the spatial filter 370 may pass a plurality of orders of the intermediate image. The spatial filter 370 may also block a DC component of the intermediate image Uo'$_n$(x, y, z).

The conversion lens 375 takes a Fourier transform of one or more orders of the intermediate image Uo'$_n$(x, y, z) located at the Fourier plane 385 to obtain an output hologram H'(u, v) of the one or more orders of the intermediate image Uo'$_n$(x, y, z). The conversion lens 375 has a focal length, f, and a front focal plane that occurs at f. The Fourier plane 385 is the front focal plane of the conversion lens 375. The conversion lens 375 outputs the output hologram H'(u, v) towards the beam splitter 380—and more generally toward the exit pupil 350.

The conversions lens 375 also acts to magnify the output hologram H'(u, v). In some embodiments, the magnification may be such that the output hologram H'(u, v) fills the exit pupil 350. The positioning and focal lengths of the objective lens 360 and the conversion lens 375 are what determine the amount of magnification. The magnification of the output hologram H'(u, v) is a technique for increasing the field of view of a holographic display. In this embodiment, the magnification provides a field of view of approximately 10°×10° (in x and y) of the virtual image (i.e., displayed portion of the reconstructed image), which corresponds to roughly a 6-7 micron pixel pitch. In embodiments, where a smaller pixel pitch is used, e.g., 3 microns, the field of view increases to approximately 20°×20°.

The beam splitter 380 directs the output hologram H'(u, v) to the exit pupil 350. In the configuration shown in FIG. 3, the holographic display element 300 is part of an AR system. Accordingly, the user is able to view a local area 385 including one or more real objects (e.g., a table) through the beam splitter 380. The beam splitter 385 generates an augmented reality (e.g., AR image 390) by combining light reflected from the local area 385 with the output hologram H'(u, v). The eye 345 performs a Fourier transform on the output hologram H'(u, v) such that one or more orders of the intermediate image Uo'$_n$(x, y, z) are imaged on the eye's retina. In alternate embodiments where the holographic display element 300 is part of a VR system environment, the beam splitter 380 may be replaced with a mirror or removed (e.g., a user would look directly into the conversion lens 375).

The controller 330 controls the source 305 using one or more illumination parameters. In embodiments, where the holographic display element 300 includes multiple sources the controller 330 may generates and provide illumination parameters to each of the multiple sources. In some embodiments, the controller 330 may adjust the intensity of the source 320 based on feedback from one or more photodetectors (e.g., element 322).

The controller 330 generates hologram instructions using synthetic images (e.g., the image $U_o(x,y,z)$). The images may be from media provided from, e.g., a VR console 110, or some other media source. Hologram instructions are instructions used by an SLM to generate a computer generated hologram. The controller 330 takes a Fourier transform of a given synthetic image (i.e., $F(U_o(x, y, z))=H(u, v)$) to determine a corresponding computer generated hologram $H(u, v)$. The controller 330 generates the hologram instructions describing $H(u, v)$, and provides the hologram instructions to the SLM 320.

There are different ways to generate computer generated holograms, some of which are described in, for example, Brown, Byron R.; Lohmann, Adolf W., "Complex spatial filtering with binary masks," Applied Optics (Optical Society of America) Volume 5, Number 6, June 1966; and J. J. Burch (1967); and "A Computer Algorithm for the Synthesis of Spatial Frequency Filters," Proceedings of IEEE (IEEE) 55: 599-601; Burrchardt, C. B., "A Simplification of Lee's Method of Generating Holograms by Computer," Applied Optics, Volume 9, Number 8, August 1970; Lee, Wai Hon, "Sampled Fourier Transform Hologram Generated by Computer," Applied Optics, Volume 9, Number 3, March 1970, Lohmann, A. W., Paris, D. P. " Binary Fraunhofer Holograms, Generated by Computer," Applied Optics, Volume 6, Number 10, October 1967, Lohmann, A. W., Sinzinger, S. "Graphic Codes for Computer Holography," Applied Optics, Volume 34, Number 17, June 1995, which are all hereby incorporated by reference in their entirety.

Note that the real image generated at the Fourier plane 385 is inverted (caused by the objective lens 360 being a positive lens). The controller 330 may account for this inversion by inverting the synthetic image $U_o(x,y,z)$ prior to taking the Fourier transform (or Fresnel Transform) to generate the hologram instructions. This would correct for the inversion caused by the objective lens 360. Additionally, while a single SLM 320 is shown, in embodiments, where there are multiple SLMs, the controller 320 generates hologram instructions for each of the SLMs.

The controller 320 also controls the spatial light filter 370. The controller 320 generates filtering instructions that cause the spatial filter 370 to pass specific orders of the intermediate image $Uo'(x, y, z)$, while blocking other orders of the $Uo'(x, y, z)$. In this manner the controller 320 may control which order of the intermediate image $Uo'(x, y, z)$ is presented to the user.

The single image field of view is the largest field of view that a reconstructed image of a synthetic image spans before clipping occurs. For the holographic display element 300 the single image field of view is approximately 10°×10°, and with 3 micron pixel pitch SLM the single image field of view increases to approximately 20°×20°. In comparison a field of view associated with the eye 345 is much larger (e.g., 130° vertical by more than 100° horizontal).

In some instances synthetic images have fields of view greater than the single image field of view (e.g., the holographic display element 300 is operating in a VR system environment). The controller 300 expands the field of view of the holographic display element 300 by dividing the synthetic image into a plurality of synthetic image portions that each have a field of view that is less than or equal to the single image field of view. The controller 330 selects one of the plurality of synthetic image portions, and determines a prism term that acts to horizontally and/or vertically shift the hologram such that a portion of the reconstructed synthetic image is provided to the exit pupil. The controller 330 controls the spatial filter 370 such that non-selected portions of the reconstructed image are blocked. The controller 330 performs similar operations for each portion of the reconstructed image. The holographic display cycles through each of the portions of the reconstructed image rapidly, displaying each for a threshold period of time, such that a viewing user's eye 345 would see all of the portions of the reconstructed image together as a single image. For example, each portion of the portions of the reconstructed images may be displayed sequentially, with the total period of presentation being shorter than a critical flicker fusion (CFF) frequency, so that no perceptible flicker is observed by a human observer. The process of rapidly displaying different portions of a reconstructed image such that they appear as a single image to the user is referred to as image tiling.

The field of view of a holographic display may also be expanded by adjusting the angle of incidence off the main beam 335 on the SLM 320, and blocking using spatial filter different portions of the image.

Figure 4:
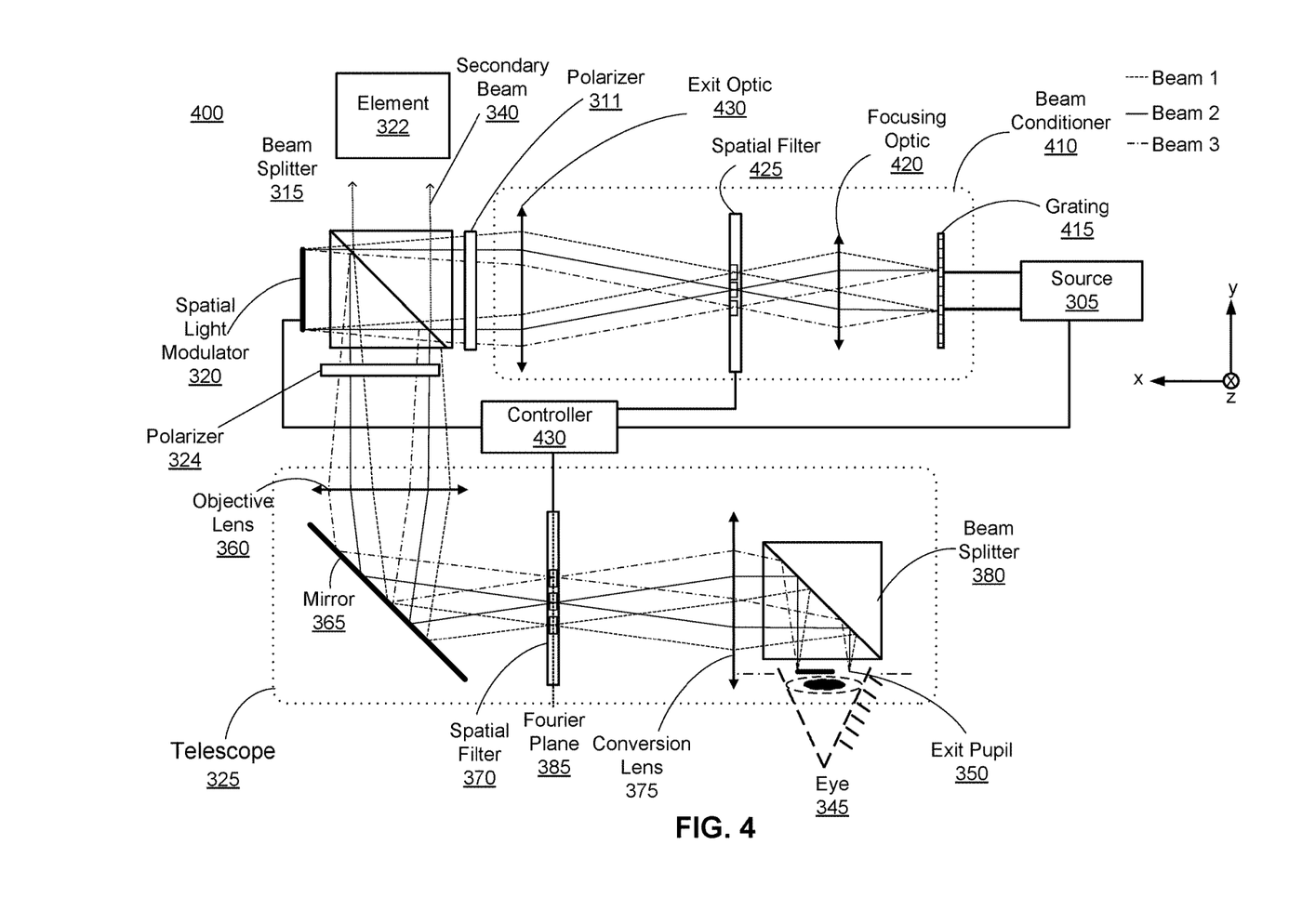
FIG. 4 illustrates an example holographic display element with an expanded field of view, according to an embodiment.

FIG. 4 illustrates an example holographic display element 400 with an expanded field of view, according to an embodiment. In some embodiments, the holographic display element 400 is a component (e.g., holographic display 115) of the VR headset 105. In alternate embodiments, the holographic display element 400 is part of some other HMD, or other system that directs display light to a particular location. Some embodiments of the holographic display element 400 have different components than those described here. Similarly, in some cases, functions can be distributed among the components in a different manner than is described here.

The holographic display element 400 includes an illumination source 305, a beam conditioner 410, a polarizer 311, a beam splitter 315, a SLM 320, an element 322, a polarizer 324, a telescope 325, and a controller 430. For purposes of illustration, FIG. 4 shows a holographic display 400 associated with a single eye 345, but in some embodiments, another holographic display separate (or partially separate) from the holographic display 400, provides altered image light to another eye of the user. In a partially separate system, one or more components may be shared (e.g., the source 405, the beam conditioner 410, the controller 430, etc.). The holographic display element 400 is substantially similar a holographic display element 300 that is modified to have an expanded field of view.

The beam conditioner 410 conditions the light from the source 305 into one or more beams of light. The beam conditioner 410 is an embodiment of the beam conditioner 310 that includes a grating 415, a focusing optic 420, a spatial filter 425, and an exit optic 430. The above components are used to generate a plurality of beams that are offset from each other in angle of incidence on the SLM 320. The beam conditioner 410 selects and outputs one or more beams, of the plurality of beams, based on instructions received from the controller 430. Additionally, in some embodiments, the beam conditioner 410 includes an optical isolator may be used to prevent light from traveling back toward the source 305.

The grating 415 is a diffraction grating that diffracts the light from the source 305 into a plurality of beams. For example, in FIG. 4 there are three diffracted beams illustrated, beam 1, beam 2, and beam 3. In this embodiments, the grating 415 is transmissive, however, in alternate embodiments a reflective diffraction grating may be used. Additionally, in some embodiments the grating 415 may be a blazed grating. Additionally, in some embodiments, the grating 415 is a 2D grating that generates diffracted beams in both x and y. Note—that the source 305 and grating 415 combination is replicating multiple sources. In other embodiments, instead of a single source 305 and a grating 415, the holographic display element 400 may have multiple sources 305.

The focusing optic 420 is a positive lens that focuses the diffracted beams at the spatial filter 425. The spatial filter 425 is configured to selectively transmit one of the diffracted beams, while blocking the remaining diffracted beams in accordance with instructions from the controller 430. The spatial filter 425 is substantially similar to the spatial filter 370. The exit optic 430 is a positive lens that transmits the selected diffracted beam to the beam splitter 315. The magnification generated by the telescope formed by the focusing optic 420 and the exit optic 430 is such that any of the diffracted beams output by the beam conditioner 410 fully illuminate the SLM 320.

The controller 430 operates in a similar manner with regard to controller 330 in generating hologram instructions and illumination parameters. But, the controller 430 determines filter instructions for both the spatial filter 425 and the spatial filter 370.

As each of the diffracted beams are incident on the SLM 120 at a different angle, a resulting field of view of a reconstructed image (of the synthetic image) at the exit pupil 350 is different. Accordingly, each of the diffracted beams are associated with a different portion of the reconstructed image.

The controller 430 generates hologram instructions and provides them to the SLM 320. The controller 430 selects a particular portion of the reconstructed image associated with one of the diffracted beams, and generates and provides filter instructions to cause the spatial filter 425 and the spatial filter 370 to pass the selected beam and block the other diffracted beams for a threshold period of time. The controller 430 then selects a different diffracted beam, and generates and provides filter instructions to cause the spatial filter 425 and the spatial filter 370 to pass the different selected beam and block the other diffracted beams for a threshold period of time, and so on. The threshold of time is selected such that the tiled images appear as a single synthetic image to the eye 345. The controller 430 cycles through each of the portions of the reconstructed image rapidly, displaying each for a threshold period of time, such that a viewing user's eye 345 would see all of the portions of the reconstructed image together as a single image.

Additionally, in some embodiments, the controller 430 may use prism terms to tile in a particular direction (e.g., in y) as described above, and use the grating 415 to tile in an orthogonal direction (e.g., in x). More generally, prism terms and the multiple beam sources (i.e., different diffracted beams) may be used separately or in combination to increase the total field of view.

Figure 5A:
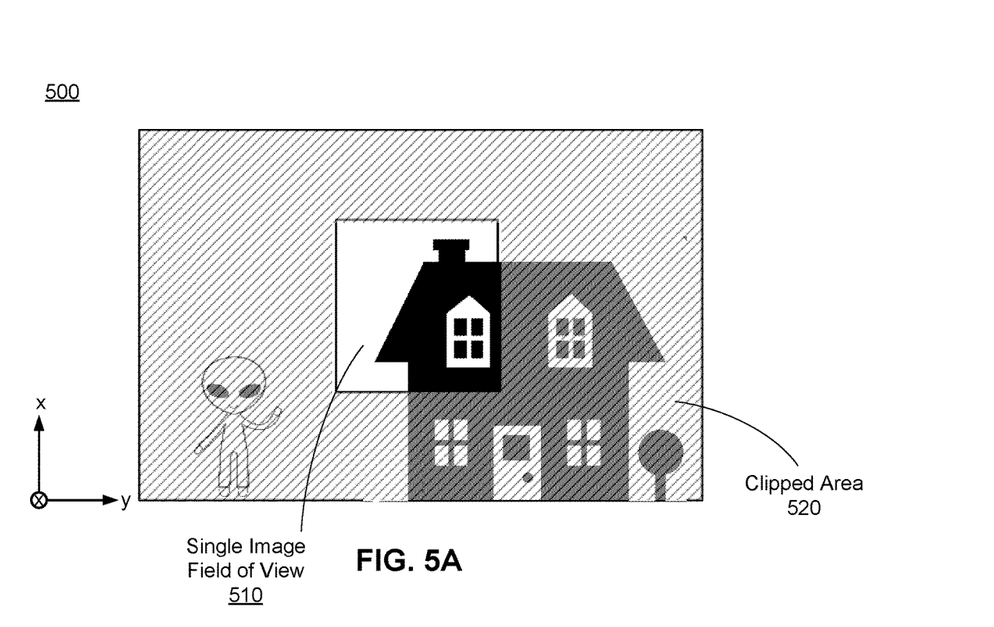
FIG. 5A illustrates a reconstructed image according to an embodiment.

FIG. 5A illustrates a reconstructed image 500 according to an embodiment. The reconstructed 500 is larger than a single image field of view 510 for a holographic display. Therefore, the reconstructed image 500 includes a clipped area 520 that is not visible to the user. In some embodiments, a holographic display 115 using e.g., prism terms and/or multiple beams as discussed above extends the field of view such that the entire reconstructed image 500 may be presented to the eye 345.

Figure 5B:
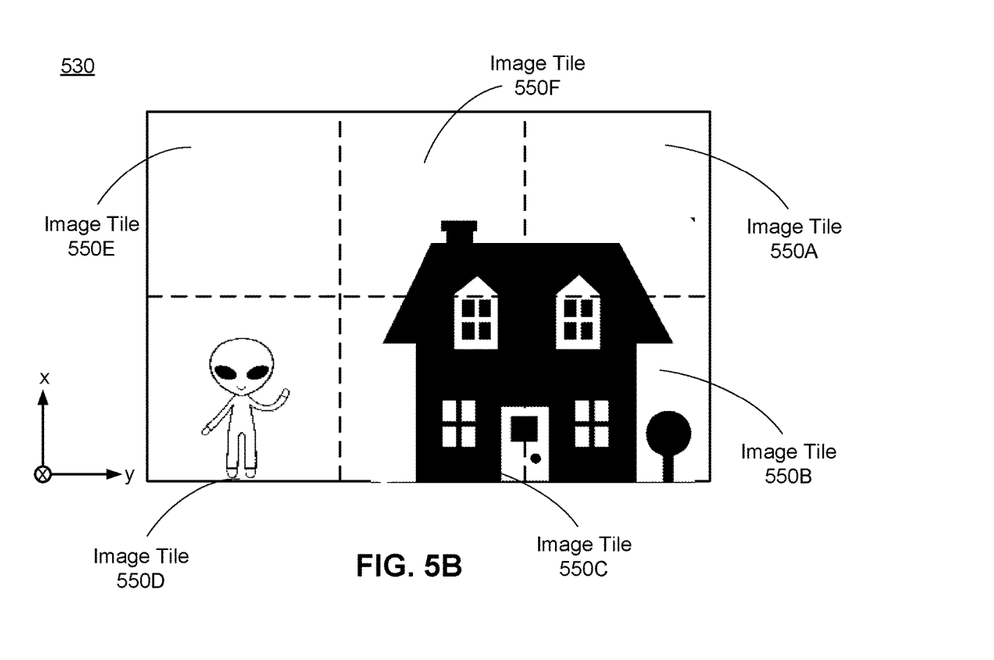
FIG. 5B illustrates a tiled version of a reconstructed image shown in FIG. 5A, according to an embodiment.

FIG. 5B illustrates a tiled version 530 of the reconstructed image 500 shown in FIG. 5A, according to an embodiment. In this example, the reconstructed image 500 is divided into 6 image tiles, specifically, image tiles 550A-F. Each of the image titles 550A-F are displaced at a slightly different times, however, close enough together in time such that an eye of the user sees the image tiles 550A-F as a single image. The refresh rate of each tile may be, e.g., 60 to 120 Hz.

In the above discussion, techniques are discussed to expand a field of view of the holographic display 115 via different types of image tiling systems. However, in alternate embodiments, a maximum field of view can be increased by adding an amplitude mask to the SLM 320. Moreover, in general, the addition of a second SLM 320 improves image quality (e.g., sharpness, contrast, etc.).

In some embodiments, holographic displays in an HMD may be used in conjunction with an eye tracking unit. For example, the eye tracking unit may include a light source emitting light as well as a camera capturing reflections of the emitted light on the user's eye. The eye tracking unit can determine eye orientation based on the captured images of the user's eye. Alternatively, other architectures for eye tracking units may be used.

The eye tracking unit would monitor orientation of one or both eyes of a user of the HMD. A controller (e.g., 330, 430) would use the eye orientations to adjust image tiles to compensate for eye movement of the user. This may be useful, for example, if the holographic display has a relatively low refresh rate (60 Hz or below) and the user's eyes are moving fast (e.g., saccades).

Figure 6:
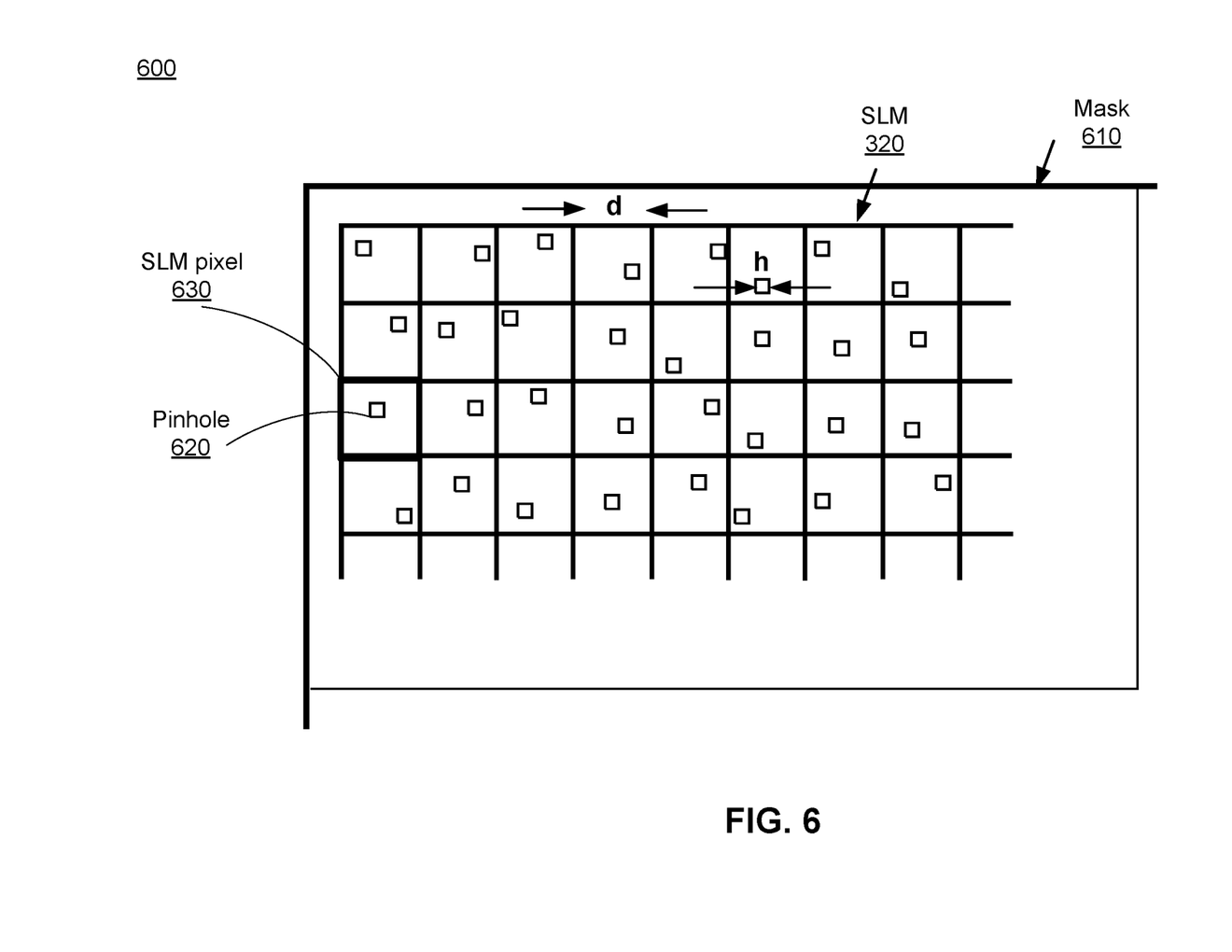
FIG. 6 illustrates a masked SLM, according to an embodiment. Typical

FIG. 6 illustrates a masked SLM 600, according to an embodiment. Typical SLMs have a repeated structure of pixels that are separated from each other via a distance (d). The masked SLM 600 includes an SLM 320 and an amplitude mask 610. The amplitude mask 600 is configured to overlay the SLM 320 and in some embodiments, may be part of the SLM 320 (e.g., the mask can be eliminated by directly fabricating SLMs with pseudorandom pitches and limited fill factors). The SLM 320 includes a plurality of SLM pixels. The amplitude mask 600 includes a single pinhole per SLM pixel. The mask 610 is opaque to light from the source 310, except for the pinholes which are transparent to the light from the source 310. For example pinhole 620 overlays SLM pixel 630, and light may pass through the pinhole 620 be encoded by the SLM pixel 630 and (for a reflective SLM 320) then pass back through the pinhole 620. Each pinhole has a width (h) that is much less than (d). For example, h may be approximately 4 microns and d may be approximately 500 microns. Each pinhole is located at a random location over the corresponding SLM pixel. As the pinholes are located randomly over their corresponding SLM pixels, higher orders of diffraction are eliminated since it breaks down periodicity of the pixel arrays.

Periodicity of pixels causes the incident light to constructively interfere at discrete output angles, creating multiple copies of a same image. Randomized locations of the pinholes over each pixel breaks down this periodicity such that the majority of the diffracted light constructively interferes along the optic axis (straight going in and out). But since a distance between the pinholes has a mean of the pitch size and standard deviation of some number, it still has a little bit of periodicity, thus preventing complete removal of higher orders. To remove entirely, the pinhole distances should have a broader range of numbers. For example, the masked SLM 600 may be modified such that there is less than 1 pinholes per pixel (e.g., move to 1 pinhole per 4 pixels). Alternatively, the number of pinholes per pixel may be increased above that shown in FIG. 6. For example, the masked SLM 600 may be modified such that there are at least 2 pinholes per pixel. Accordingly, if a masked SLM 600 were used in place the SLM 320 in, for example, the holographic display element 300, there would be no field of view restriction caused by the diffraction orders of the computer generated hologram—as there would be only the fundamental order.

In alternate embodiments (not shown), the pinholes may be located at the same relative location above each SLM pixel (e.g., all located at the center of corresponding SLM pixel). Each pinhole essentially reduces the size of the SLM pixel underneath and enables the input light to diffract out at larger angles. It makes the intensity profile of the reconstructed image more uniform, otherwise the periphery of the images would be darker than in the center. The contrast of constructed image can be improved when periodic pinholes are fabricated on an SLM, compared to random pinhole pattern. Multiple diffraction orders due to periodicity of pinholes can be removed by a spatial filter 370 described above.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A holographic display of a head-mounted display (HMD) comprising:
   a source configured to emit light that is at least partially coherent light;
   a beam conditioner that conditions the light from the source into one or more beams of light;
   a spatial light modulator (SLM) configured to encode the one or more beams of light using a hologram of a virtual reality image;
   an objective lens having a first focal length, the objective lens configured to create an intermediate image at a Fourier plane, wherein the intermediate image is a Fourier transform of the hologram;
   a conversion lens having a second focal length, the conversion lens positioned away from the Fourier plane by the second focal length and configured to:
     perform a Fourier transform of the intermediate image to generate an output hologram,
     magnify a portion of the output hologram, the magnification based in part on the first focal length and the second focal length, and
     direct the magnified portion of the output hologram towards an exit pupil of the HMD corresponding to a location of an eye of a user of the HMD.

2. The holographic display of claim 1, further comprising:
   a controller module configured to:
     calculate a Fresnel wave propagation of a three-dimensional synthetic image to generate a computer generated hologram,
     generate hologram instructions using the computer generated hologram, and
     provide the hologram instructions to the SLM; and
   wherein responsive to receiving the hologram instructions, the SLM displays the hologram in accordance with the hologram instructions.

3. The holographic display of claim 1, further comprising: a spatial filter located at the Fourier plane, the spatial filter configured to transmit a single order of the intermediate image and block the remaining orders of the intermediate image and a DC component.

4. The holographic display of claim 3, wherein the magnified portion of the output hologram is associated with two adjacent portions of a reconstructed image associated with the output hologram and the two adjacent portions are associated with different prism terms, and the two adjacent portions of the reconstructed image span a field of view larger than a largest field of view that a reconstructed image of a synthetic image can span without clipping.

5. The holographic display of claim 1, wherein the beam conditioner further comprises:
   a diffraction grating configured to diffract the light emitted from the source into a plurality of diffracted beams, each beam corresponding to a different field of view of a reconstructed image associated with the output hologram;

a focusing optic configured to focus the plurality of diffracted beams on a first plane; and a first spatial filter located at the first plane, the spatial filter configured to sequentially transmit different diffracted beams, of the diffracted beams, that each correspond to different fields of view of the reconstructed image, in accordance with filter instructions.

6. The holographic display of claim 5, further comprising:

a second spatial filter located at the Fourier plane, the second spatial filter configured to sequentially transmit different diffracted beams, of the diffracted beams, that each correspond to different fields of view of the reconstructed image, in accordance with the filter instructions.

7. The holographic display of claim 6, wherein the magnified portion of the output hologram comprises a plurality of different portions of the output hologram that each correspond to a different diffracted beam.

8. The holographic display of claim 1, further comprising:

an additional source that is offset from the source and the additional source is associated with a field of view of the reconstructed image that is different from a field of view of the reconstructed image that is associated with the source.

9. The holographic display of claim 1, wherein the SLM includes a plurality of SLM pixels and each SLM pixel is overlaid with an opaque portion and a pinhole.

10. The holographic display of claim 9, wherein each pinhole is positioned randomly above its corresponding SLM subpixel.

11. The holographic display of claim 9, wherein each pinhole is positioned at a same relative location above its corresponding SLM pixel.

12. The holographic display of claim 1, wherein the SLM modulates phase information of the beam of light to encode the beam with phase information of the hologram.

13. The holographic display of claim 12, further comprising an additional SLM configured to modulate phase information of the beam of light to encode the beam with additional phase information of the hologram.

14. The holographic display of claim 1, wherein the SLM includes a plurality of SLM pixels and each SLM pixel is overlaid with an opaque portion and a pinhole, and each pinhole is positioned randomly above its corresponding SLM subpixel.

15. A holographic display of a head-mounted display (HMD) comprising:

an source configured to emit at least partially coherent light;

a beam conditioner that conditions the light from the source into one or more beams of light;

a spatial light modulator configured to encode the one or more beams of light using a hologram of a virtual reality image;

an objective lens, having a first focal length, the objective lens positioned to create an intermediate image at a Fourier plane, wherein the intermediate image is a Fourier transform of the hologram;

a folding mirror that positions the real image of the hologram at the Fourier plane;

a conversion lens having a second focal length, the conversion lens positioned away from the Fourier plane by the second focal length and configured to:

perform a Fourier transform of the intermediate image to generate an output hologram, magnify a portion of the output hologram, the magnification based in part on the first focal length and the second focal length, and direct the magnified portion of the output hologram towards an exit pupil of the HMD corresponding to a location of an eye of a user of the HMD.

16. The holographic display of claim 15, further comprising:

a spatial filter located at the Fourier plane, the spatial filter configured to transmit a single order of the reconstructed image and block the remaining orders of the reconstructed image.

17. The holographic display of claim 16, wherein the magnified portion of the output hologram is associated with two adjacent portions of a reconstructed image associated with the output hologram and the two adjacent portions are associated with different prism terms, and the two adjacent portions of the reconstructed image span a field of view larger than a largest field of view that a reconstructed image of a synthetic image can span without clipping.

18. The holographic display of claim 15, wherein the beam conditioner further comprises:

a diffraction grating configured to diffract the light emitted from the source into a plurality of diffracted beams, each beam corresponding to a different field of view of a reconstructed image associated with the output hologram;

a focusing optic configured to focus the plurality of diffracted beams on a first plane; and a first spatial filter located at the first plane, the spatial filter configured to sequentially transmit different diffracted beams, of the diffracted beams, that each correspond to different fields of view of the reconstructed image, in accordance with filter instructions.

19. The holographic display of claim 18, further comprising:

a second spatial filter located at the Fourier plane, the second spatial filter configured to sequentially transmit different diffracted beams, of the diffracted beams, that each correspond to different fields of view of the reconstructed image, in accordance with the filter instructions.

20. A holographic display of a head-mounted display (HMD) comprising:

an source configured to emit at least partially coherent light;

a beam conditioner that conditions the light from the source into one or more beams of light;

a spatial light modulator configured to encode the one or more beams of light using a hologram of a virtual reality image;

an objective lens, having a first focal length, the objective lens positioned to create an intermediate image at a Fourier plane, wherein the intermediate image is a Fourier transform of the hologram;

a conversion lens having a second focal length, the conversion lens positioned away from the Fourier plane by the second focal length and configured to:

perform a Fourier transform of the intermediate image to generate an output hologram, and magnify a portion of the output hologram, the magnification based in part on the first focal length and the second focal length; and a beam splitter configured to:

create an augmented image by combining light from a local area of the HMD with the magnified portion of the output hologram, and direct the augmented image to an exit pupil of the HMD corresponding to a location of an eye of a user of the HMD.

* * * * *

UNITED STATES PATENT AND TRADEMARK OFFICE
CERTIFICATE OF CORRECTION

PATENT NO.         : 9,964,925 B2
APPLICATION NO.    : 14/983109
DATED              : May 8, 2018
INVENTOR(S)        : Hee Yoon Lee et al.

Page 1 of 1

It is certified that error appears in the above-identified patent and that said Letters Patent is hereby corrected as shown below:

In the Claims

Column 17, Line 50, Claim 15 delete "an" and insert -- a --.
Column 18, Line 45, Claim 20 delete "an" and insert -- a --.

Signed and Sealed this
Second Day of October, 2018

Andrei Iancu
*Director of the United States Patent and Trademark Office*